United States Patent [19]
Heller

[11] 3,755,921
[45] Sept. 4, 1973

[54] FLASH-CARD EDUCATIONAL AID FOR TEACHING SEQUENCES

[76] Inventor: Aaron Heller, 23 W. 68th St., New York, N.Y. 10023

[22] Filed: May 8, 1972

[21] Appl. No.: 251,323

[52] U.S. Cl............................................... 35/22 R
[51] Int. Cl. ........................................... G09b 19/00
[58] Field of Search ................. 35/9 R, 9 E, 22 R, 35/22 A, 8 R, 35 R

[56] References Cited
UNITED STATES PATENTS

| | | | |
|---|---|---|---|
| 3,081,560 | 3/1963 | Campoagud | 35/35 R |
| 3,172,214 | 3/1965 | Aberge et al. | 35/8 R |
| 3,539,077 | 11/1970 | Drexler et al. | 222/82 |
| 1,509,371 | 9/1924 | Nalle | 35/22 R |
| 1,587,026 | 6/1926 | Nalle | 35/22 R |
| 2,659,163 | 11/1953 | Albee | 35/8 R |

FOREIGN PATENTS OR APPLICATIONS
270,881   5/1927   Great Britain ..................... 35/22 R Primary Examiner—Wm. H. Grieb
Attorney—Myron Cohen, Maurice B. Stiefel et al.

[57] ABSTRACT

A flash-card type educational aid comprising a board having top and bottom (or left and right side) portions, each of which portions is provided with an equal and identically arranged plurality of slots for removably mounting indicia bearing inserts therein to form a sequence comprising said inserts, and a cover pivotally secured to one of said portions for alternately revealing and concealing a sequence of indicia bearing inserts formed in one of said plurality of slots whereby the ability to duplicate a flashed sequence in said other plurality of slots may be tested.

5 Claims, 6 Drawing Figures

Patented Sept. 4, 1973 3,755,921

FLASH-CARD EDUCATIONAL AID FOR TEACHING SEQUENCES

BACKGROUND OF THE INVENTION

1. Field of the Invention

The invention relates to educational aids, and in particular, to a "flash-card" type of device wherein sequentially arranged subject matter is momentarily flashed to a viewer and then concealed from view while the viewer attempts to duplicate the subject matter in the correct sequence.

2. Prior Art

Flash cards and multiple sequence teaching devices are known in the art. One such prior device is a device employing multiple sequences, each sequence comprising a plurality of "chips" wherein a student must match one of the already positioned chips in the sequence with three identical chips and one chip bearing a dissimilar indicia thereon. Such device employs electrical means for indicating the correctness of the sequence.

Another such prior art device is disclosed in U.S. Pat. No. 3,172,214, which discloses an image to word match of sequences wherein the image sequence comprises a plurality of chips and the word sequence comprises a single piece having a plurality of matching words printed thereon in the sequence as opposed to a plurality of pieces. However, such prior art devices do not disclose a flash card arrangement wherein a sequence comprising a plurality of chips each bearing a different indicia thereon in the sequence is recreated from "memory" using an identical plurality of chips after having observed the "flashed" sequence.

Accordingly, to applicant's knowledge, there are presently no available prior art flash-card type sequence teaching aids wherein a plurality of chips can be utilized to recreate a flashed sequence comprising an identical plurality of such chips and wherein both the chips comprising the sequence to be flashed and the matching sequence are removably mounted in the flash card so that the sequence to be tested may be easily varied.

SUMMARY OF THE INVENTION

The present invention provides a flash-card type educational aid which enables a user to test his ability to memorize and duplicate a sequence of symbols or other indicia by momentarily viewing such a sequence and then having the sequence concealed from view while he attempts to duplicate it.

The invention provides a board which is divided into first and second portions which may preferably be oriented in a top and bottom or left-side and right-side arrangement. Each side portion is preferably provided with an equal and identically arranged plurality of slots in which indicia bearing inserts may be removably mounted to form a sequence. One of the above said portions has a cover pivotally secured thereto, which cover can be raised or lowered to reveal or conceal the sequence of indicia bearing inserts removably mounted in one of the plurality of slots.

When the two portions are in top and bottom arrangement, by way of example, the slots will preferably be arranged in horizontal rows, and the cover is pivotally secured to either the top or the bottom portion.

When the two portions are in the left-side and right-side arrangement, the slots will preferably be arranged in vertical rows, and the cover is pivotally secured to either the left-side or right-side portion.

The removably mountable inserts may bear any type of indicia which are suitable for testing purposes. For example, the inserts may bear a series of arbitrary symbols such as geometric shapes, or a series of intelligent symbols such as letters, numerals, or elements of a mathematical, chemical or logical equation.

To use the present invention, a plurality of indicia bearing inserts is arranged, while concealed from the view of the test subject, in any desired sequence in one set of the slots in the board, and the cover is pivoted to conceal such sequence. The test subject is then provided with a second, identical set of indicia bearing inserts and the cover is momentarily raised and lowered to "flash" the sequence before the subject. After the cover has been lowered, and with the sequence concealed from view, the subject tries to duplicate the sequence by mounting the second set of inserts in the other set of slots in the board.

DESCRIPTION OF THE PREFERRED EMBODIMENTS

Figure 1:
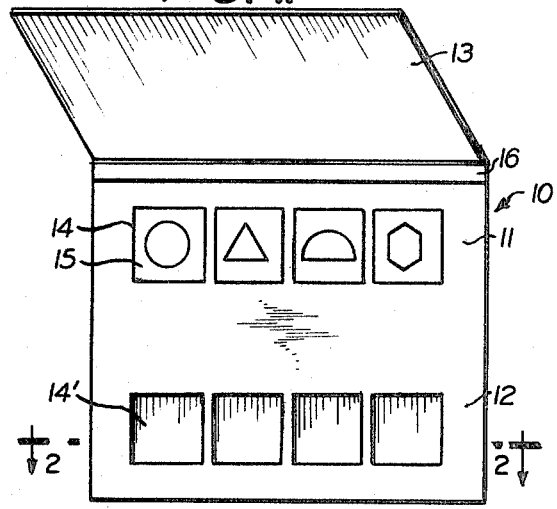
FIG. 1 is top plan view of the board with indicia bearing inserts mounted in the top portion thereof, with the cover in the raised position.

The construction and operation of the preferred embodiments of the invention will now be described in detail, in conjunction with the appended drawing in which like parts shown in the several figures are assigned the same reference numeral.

Figure 2:
FIG. 2 is a cross section taken along the line 2—2 in FIG. 2.

Referring to FIG. 1, there is shown a board 10, which is preferably made of a rigid material such as cardboard. The board 10 is divided into two portions 11 and 12, arbitrarily designated top and bottom respectively. A cover 13 is preferably conventionally hinged to the upper edge of top portion 11 such as by two strips of gummed paper 16 and 17 to permit movement of the cover 13 relative to the board 10. Within the region generally designated as top portion 11, there is provided a horizontal row of slots 14, while in the region generally designated as bottom portion 12, there is provided an identical horizontal row of slots 14', also shown in FIG. 2, which is a cross-sectional view of the board of FIG. 1 taken along the line 2—2.

Each of the slots 14 in top portion 11 is shown with an indicia bearing insert 15 in place. In the embodiment shown, for purpose of illustration, the inserts 15 bear arbitrary symbols, such as geometric symbols, although, if desired, these inserts 15 may bear intelligent symbols such as letters, numerals or the elements of a mathematical, logical or chemical equation or any other symbols or indicia suitable for testing purposes.

Figure 3:
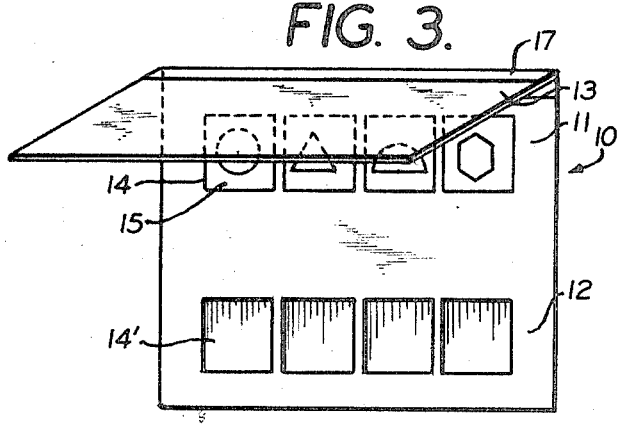
FIG. 3 is a perspective view of the board shown in FIG. 1 with the cover partly closed.
Figure 4:
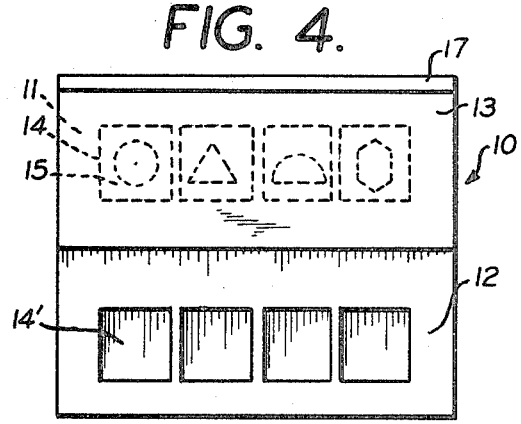
FIG. 4 is a top plan view of the board shown in FIG. 1 with the cover completely closed.
Figure 5:
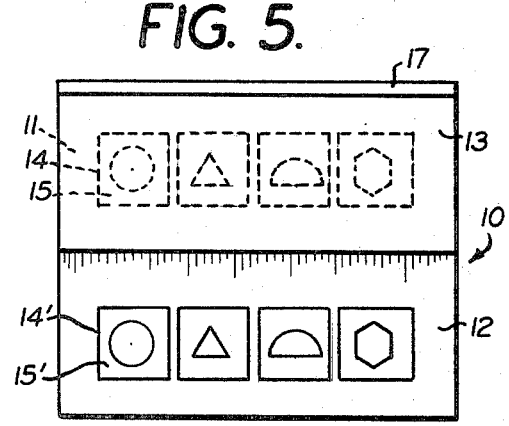
FIG. 5 is a top plan view of the board shown in FIG. 4 with an identical set of indicia bearing inserts correctly mounted in the bottom portion thereof.

In utilizing the present invention as a flash-card type educational aid, the cover 13 is pivoted to the open position to expose the slots 14 in top portion 11. A plurality of indicia bearing inserts 15 is then arranged in a desired sequence, such as the sequence shown by way of example in FIG. 1, while concealed from the view of the subject to be tested. The slots 14' in the bottom portion 12 are empty at this time. The cover 13 is then pivoted to the closed position illustrated in FIG. 4, a partially closed intermediate position of cover 13 being illustrated in FIG. 3. The test subject is provided with a second identical set of indicia bearing inserts 15', or a group of inserts 15' containing the identical set of inserts 15 as well as additional dissimilar inserts. This second set of inserts 15' is preferably provided in a random arrangement. The cover 13 is then momentarily pivoted or "flashed" between the closed position of FIG. 4 and the open position of FIG. 1 and back to the closed position of FIG. 4, to expose or flash the sequence 15 before the test subject, the flash interval being dependent on the desired recall time to be tested. After the cover 13 has been returned to the closed position so as to once again conceal the sequence 15 from view, the board 10 is given to the test subject who then attempts to duplicate the flashed sequence in slots 14' by mounting the second set of inserts 15' in these exposed slots 14', such correct sequence duplication being illustrated in FIG. 5.

Figure 6:
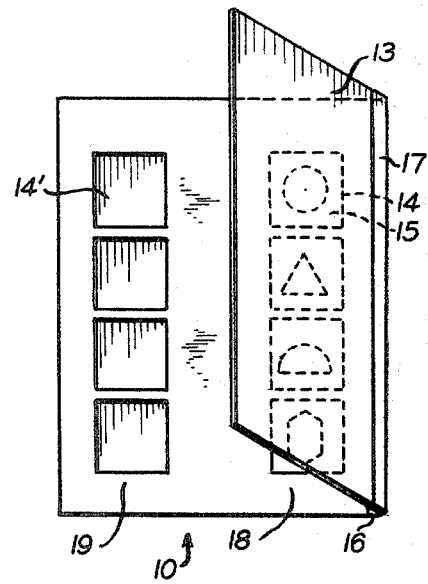
FIG. 6 is a perspective view of an alternative embodiment of the board wherein the board is oriented with the slots arranged in left-side right-side arrangement, with the cover pivotally secured to the right-side, and in partly closed position.

If desired, the board 10 may be arranged as illustrated in FIG. 6 with the slots 14 and 14' in vertical rows and the cover 13 pivotally secured to one side 18 of the board 10 in a left-right or side-to-side relationship as opposed to the top-bottom relationship illustrated in FIG. 1. The utilization of the embodiment shown in FIG. 6 is identical with that previously described with reference to FIGS. 1–5.

Variations and modifications can, of course, be made without departing from the spirit and scope of the invention.

For example, the indicia can be constituted by materials which are distinguishable to the touch such as sandpaper, metal, felt and the like and which can be used such as for testing the blind.

Having thus described my invention, what I desire to secure by Letters Patent and hereby claims is:

1. An educational aid comprising a board having first and second portions, each said portion having an equal and identically arranged plurality of slots, first and second sets of indicia bearing inserts removably mountable in said slots to form a sequence, said sets being duplicates of each other and each comprising a plurality of said inserts equal to said portion slot plurality, and a cover pivotally secured to one of said portions, whereby said cover can be raised to reveal a sequence of one of said sets of indicia bearing inserts mounted in the slots in said one portion and lowered to conceal said sequence and enable a viewer to attempt to duplicate said sequence in the slots in the other said portion with the other of said sets.

2. An educational aid as claimed in claim 1, wherein the first and second portions are respectively top and bottom portions and the pluralities of slots are arranged in horizontal rows.

3. An educational aid as claimed in claim 1, wherein the first and second portions are respectively left and right side portions and the pluralities of slots are arranged in vertical rows.

4. An educational aid as claimed in claim 1, wherein the indicia borne by the inserts are arbitrary symbols.

5. An educational aid as claimed in claim 1, wherein the indicia borne by the inserts are intelligent symbols.

* * * * *